United States Patent [19]

Fujioka

[11] Patent Number: 5,557,854
[45] Date of Patent: Sep. 24, 1996

[54] METHOD FOR MEASURING PRELOAD CLEARANCE IN DOUBLE ROW ROLLING BEARING AND APPARATUS THEREFORE

[75] Inventor: Hakaru Fujioka, Shiga-ken, Japan

[73] Assignee: NSK Ltd., Shinagawa-ku, Japan

[21] Appl. No.: 383,503

[22] Filed: Feb. 3, 1995

[30] Foreign Application Priority Data

Feb. 4, 1994 [JP] Japan .................................. 6-012553

[51] Int. Cl.$^6$ .................................................. G01B 5/14
[52] U.S. Cl. .............................. 33/517; 33/701; 33/549; 33/600
[58] Field of Search ........................... 33/517, 701, 832, 33/833, 837, 600, 549, 555; 73/865.8, 865.9, 118.1; 29/724

[56] References Cited

U.S. PATENT DOCUMENTS

| | | | |
|---|---|---|---|
| 2,627,120 | 2/1953 | Hotchkiss | 33/517 |
| 4,468,861 | 9/1984 | Overland | 33/517 |
| 4,993,165 | 2/1991 | French et al. | 33/517 |
| 5,224,273 | 7/1993 | Dellas | 33/517 |
| 5,325,599 | 7/1994 | Russell | 33/517 |

FOREIGN PATENT DOCUMENTS

| | | |
|---|---|---|
| 5256635 | 10/1993 | Japan . |
| 567081 | 7/1977 | U.S.S.R. ................................ 33/517 |

*Primary Examiner*—Christopher W. Fulton
*Attorney, Agent, or Firm*—Helfgott & Karas, P.C.

[57] ABSTRACT

A method of measuring the preload clearance in a double row rolling bearing. The double row rolling bearing includes an outer ring having outer raceways in double rows on its inner peripheral surface and first and second inner rings each having an inner raceway on its outer peripheral surface. Each of the first and second inner rings are provided concentric with the outer ring. The double row rolling bearing further includes a plurality of rolling members provided between the inner raceways and the outer raceways in double rows, respectively. The rolling members are preloaded when the first and second inner rings are abutted to each other at their inner end edges. The method includes the steps of obtaining the dimension $H_1$ corresponding to the distance between the outer end faces of the pair of inner rings when the pair of inner rings are pressed lightly at their outer end faces in a direction to be closer to each other. Obtaining the dimension $H_2$ corresponding to the distance between the outer end faces of the pair of the inner rings when a plurality of spacers having the same thickness which is known are inserted from the radially inner side between the inner end edges of the pair of inner rings, and obtaining the difference $(H_2-H_1)$ between the obtained dimension of $H_2$ and the obtained dimension of $H_1$ and subtracting from the difference from the thickness T to obtain the preload clearance.

2 Claims, 4 Drawing Sheets

METHOD FOR MEASURING PRELOAD CLEARANCE IN DOUBLE ROW ROLLING BEARING AND APPARATUS THEREFORE

FIELD OF THE INVENTION

The present invention relates to a method and apparatus for measuring a preload clearance in a double row rolling bearing, which are utilized to measure the size of the preload clearance provided to preload the double row rolling bearing to rotatably support a vehicle wheel.

DESCRIPTION OF THE RELATED ART

In order to support a vehicle wheel in a suspension apparatus, a double row rolling bearing comprises, for example as shown in FIG. 1, an outer ring or race 1 having outer raceways 2 in double rows on its inner peripheral surface, a pair of inner ring or race 3a, 3b concentric with the outer ring or race 1 on the inside of the outer ring or race 1 and having an inner raceway on their outer peripheral surfaces, respectively, and a plurality of rolling members 5 provided between the inner raceways 4 and the outer raceways 2, respectively. The outer race or ring 1 is supported by a suspension apparatus (not shown) for installation in the vehicle.

The prior art double row rolling bearing as shown above is generally adapted to provide the rolling members 5 with a slight preload or a slight clearance when installed in the vehicle. And, there is no mass produced double row rolling bearing having the inner rings or races 3a, 3b between the inner end edges of which a preload clearance is provided to preload the rolling members 5 by a predetermined amount.

Recently, the double row rolling bearings for installation into vehicles are developed to have a preload clearance in themselves before installation in order to increase rigidity in the wheel bearing portion and reduce the weight of the wheel bearing portion and to improve driving performance. It is noted that the double row rolling bearing having a preload provided in the rolling members 5 can be given more rigidity than the double row rolling bearing without such a preload.

Consequently, the bearing manufacturers are requested by the automobile manufacturers to provide the bearings themselves with a slight preload clearance in the stage of bearing production and to guarantee the precision of the preload clearance.

Therefore, in the double row rolling bearing of FIG. 1, the rolling members 5 are preloaded before installation into the vehicle by regulating the outer ring 1, inner rings 3a, 3b and rolling members 5 in size so that the inner end edges of the pair of inner rings 3a, 3b are abutted to each other so as to provide the rolling members 5 with a predetermined preload. It will be noted that the inner end edge of the inner ring 3a is faced to the inner end edge of the inner ring 3b.

Specifically, the pair of inner rings 3a, 3b are lightly pressed at their outer end faces so as to be moved toward each other so that a clearance is formed between the inner end edges of the inner rings 3a, 3b to have a width size h in the state where the rolling members 5 are lightly engaged with the outer raceways 2 and with the inner raceways 4. It will be noted that the outer end faces of the inner rings 3a, 3b are faced to the opposite directions.

The inner end edges come into contact with each other when preloaded upon installation of the double row rolling bearing into the vehicle. In this state, the outer ring 1, inner rings 3a, 3b and rolling members 5 are elastically deformed to produce a preload.

Accordingly, the width size h is referred to as a preload clearance for providing a predetermined preload.

Incidentally, the rolling members 5 are formed in a ball shape, but can be formed in a tapered roll shape for use in a hub unit incorporated in a heavy vehicle. In this case, the raceways 2 and 4 have a linear cross sectional shape.

Anyhow, it is important to provide a double row rolling bearing and the vehicle with such a double row rolling bearing with the best performance that the preload clearance is regulated to a proper value so as to provide the rolling members 5 with a preload.

If the preload clearance or preload is too small, or if a force to press the rolling members 5 between the raceways 2 and 4 is too small, the bearing rigidity would be insufficient, and in a worst case, backlash would be caused in the inner rings 3a, 3b, to support the axle inside the outer ring 1. Consequently, the traveling stability of the vehicle would be damaged or in an extreme case, abnormal noises would be produced during traveling.

On the contrary, if the preload clearance or preload is too large, or if a force to press the rolling members 5 between the raceways 2 and 4 is too large, the rotation resistance would be so increased that the power capacity and fuel consumption performance of the vehicle would be reduced, or the life of the hub unit would be shortened due to the excessive face pressure on the rolling face of the rolling members or on the raceways. In the worst cases, normal operation would be impossible due to abnormal heat generation.

In order that any poor preload to cause various troubles as mentioned above is avoided, the width size h of the clearance 6 must be obtained corresponding to the preload clearance. If the width size obtained is displaced out of the proper range, the double row rolling bearing having such an improper width size must be thrown away, and the data are fed back to the processing steps of bearing parts to adjust the width size in the proper range.

Such a method to measure the preload or preload clearance in the double row rolling bearing is disclosed in Japanese Patent First Publication KOKAI No. H5-256635 as follows;

(1) In the state where the inner rings 3a, 3b are abutted at their inner end edges to each other under a preload, the outer ring 1 is rotated with reference to the inner rings 3a, 3b to obtain the rotating torque, from which the preload is obtained.

(2) A spacer having a thickness T (known) in size is sandwiched between the inner rings 3a, 3b to obtain the axial displacement ha of the inner ring 3a, 3b with reference to the outer ring 1, from which the preload clearance h is obtained to be equal to T-ha.

(3) A constant pressure fluid such as a compressed air is sent to the inside of the inner ring 3a, 3b assembled as shown in FIG. 1 and flowed out through the clearance 6 to the outside, and the flow amount and back pressure at this moment are measured to know the width size h of the clearance 6.

In the measurement of bearing preload as in Measurements (1) to (3) mentioned above, however, there are some problems as follows:

In the case of Measurement (1), because the preload is not directly measured, the preload is not precisely obtained.

Since the quality precision required in the double row rolling bearing for use in the recent automobile industry is very severe, so that sufficient precision is hardly obtained in the Measurement (1).

In Measurement (2), precise values for the preload clearance is obtained, but it is inconvenient and takes a long time to sandwich the spacer between the inner rings 3a, 3b. In addition, automation is so difficult, that it is impossible to measure a large number of double row rolling bearings for the preload clearance, e.g. in the case where the whole number of the products are examined in situ in the manufacturing plants.

Measurement (3) is worse in measurement precision to Measurement (2). Specifically, the flow amount and back pressure when the constant pressure fluid flows out of the clearance 6 has a constant width size h. For example, the temperature, humidity (water content), or cleanness, of the constant pressure fluid, or the width size, surface roughness, chamfering degree, etc. of the inner end edges of the inner rings 3a, 3b, variances of the clearance components etc. would cause the flow amount or back pressure to change in a not-negligible degree. Accordingly, sufficient precision would hardly be obtained.

In addition, foreign materials such as dust can exist in the outlet port of the constant pressure fluid, or in the inner end edge portions of the inner rings 3a, 3b, and be blown by the constant pressure fluid to enter the interior of the bearing where the rolling members 5, outer raceways 2 and inner raceways 4 are located. Such foreign materials entering the interior of the bearing would undesirably effect the bearing performance.

SUMMARY OF THE INVENTION

An objective of the present invention is to provide a method and apparatus to measure the preload clearance of the double row rolling bearing to overcome the problems as mentioned above.

Another objective of the present invention is to provide a method of measuring the preload clearance in a double row rolling bearing which comprises an outer ring having outer raceways in double rows on its inner peripheral surface, first and second inner rings each having an inner raceway on its outer peripheral surface and each provided concentric with the outer ring, and a plurality of rolling members provided between the inner raceways and the outer raceways in double rows, respectively, and the rolling members being preloaded in the state where the first and second inner rings are abutted to each other at their inner end edges, and the method comprising the following steps (1) to (3).

(1) The dimension $H_1$ corresponding to the distance between the outer end faces of the pair of the inner rings is obtained in the state where the pair of inner rings are pressed lightly at their outer end faces in a direction to be closer to each other.

(2) The dimension $H_2$ corresponding to the distance between the outer end faces of the pair of the inner rings is obtained in the state where a plurality of spacers having the known same thickness T are inserted from the radially inner side between the inner end edges of the pair of inner rings.

(3) The difference $(H_2-H_1)$ between the dimension $H_2$ obtained in step (2) and the dimension $H_1$ obtained in step (1) is subtracted from the thickness T to produce the value $[T-(H_2-H_1)]$, which is referred to as the preload clearance.

The apparatus for measuring the preload clearance in the double row rolling bearing according to the present invention comprises a receiving block having an upper face to which the outer end face of the first inner ring is abutted, a retaining block having a lower face provided with a retaining face to which the outer end face of the second inner ring is abutted to apply a downward light weight to the second inner ring, an insert portion projected downwards from a lower face of the retaining block, which is provided radially inside the retaining face, so as to be received within the inner rings, a plurality of spacers having the known same thickness T and supported below the insert portion at a position lower than the retaining face by an axial length of the first inner ring so as to be displaced in a radial direction of the insert portion, a driving device for driving the spacers so that the tips of the spacers move in and out across the outer peripheral surface of the insert portion, and a measurement device for measuring the vertical position of the retaining block.

In the method and apparatus for measuring the preload in the double row rolling bearing in the present invention, the preload clearance is easily and precisely obtained, and automation for measurement is possible.

PREFERRED EMBODIMENTS OF THE PRESENT INVENTION

Figure 1:
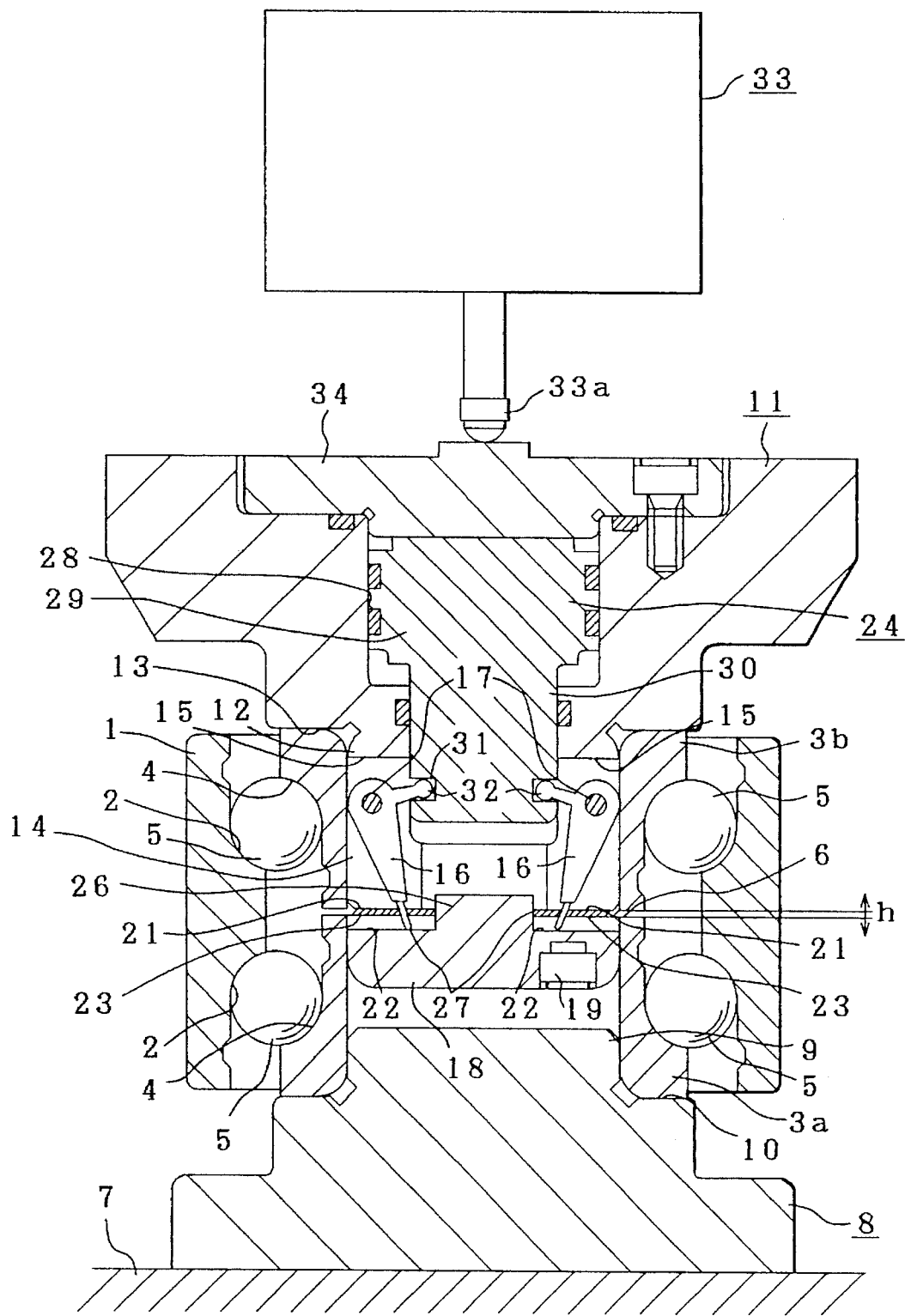
FIG. 1 is a vertical cross sectional view showing an embodiment of the apparatus for measuring the preload clearance in the double row rolling bearing according to the present invention.
Figure 2:
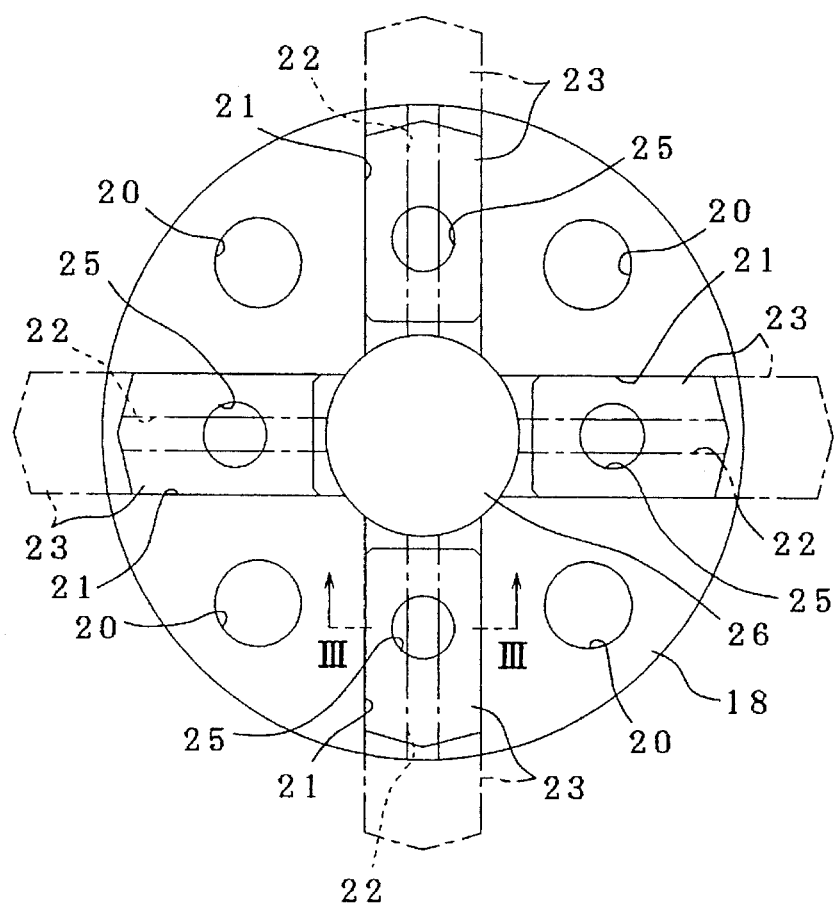
FIG. 2 is a plan view showing a spacer engaged with a recess on the upper face of the support member.
Figure 3:
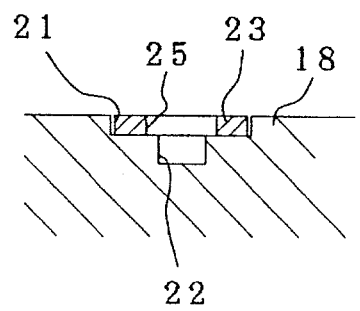
FIG. 3 is a view taken along the line III–III in FIG. 2.

Now, an embodiment of the apparatus for measuring the preload clearance in the double row rolling bearing according to the present invention is explained referring to FIG. 1 to FIG. 3.

The apparatus comprises a base plate 7 and a receiving block 8 fixed on the upper face of the base plate 7. The receiving block 8 is made of a material such as metal which has a sufficient rigidity and is hard to be elastically deformed.

Formed in the upper center portion of the receiving block 8 is a short, cylindrical protrusion 9 which is sized to be inserted in the first or lower inner ring 3a without play.

Formed around the protrusion 9 on the end face of the receiving block 8 is an annular flat bearing surface 10 to which the outer end face (lower end face in FIG. 1) of the first or lower inner ring 3a is to be abutted.

Provided above the second or upper inner ring 3b is a retaining block 11 which is made of a material such as metal which is hard to be elastically deformed, and a protrusion 12 is provided at the lower central portion of the retaining block 11 so as to be inserted within the second inner ring 3b with no play.

Provided around the protrusion 12 on the lower end face of the retaining block 11 is an annular flat retaining face 13 to which the outer end face (upper end face in FIG. 1) of the second inner ring 3b is abutted.

The retaining block 11 made of a material such as metal has a proper weight which applies a downward light load to the second inner ring 3b.

Specifically, the first inner ring 3a is placed in the bearing face 10 of the receiving block 8 while the retaining block 11 is placed on the second inner ring 3b. In this state, the rolling faces of the rolling members 5, outer raceways 2 and inner raceways 4 come into light contact with each other under substantially no preload. There is a clearance 6 formed between the inner end edge of the inner ring 3a and the inner end edge of the inner ring 3b. the width size h of this clearance 6 is the preload clearance to be measured.

Projected from the lower face of the retaining block 11 on the radially inside of the retaining face 13 is a cylindrical insert portion 14 which is positioned lower than the retaining face 13 so as to be inserted within the pair of inner rings 3a, 3b.

The insert portion 14 has a plurality of slit-like holding portions 15 extending axially (in the up-and-down directions in FIG. 1) and circumferentially separated from each other. There are four holding portions 15 in FIG. 1.

There is a rocking arm 16 pivotably supported in the holding portions 15, respectively, so as to swing around the cross shaft 17.

Provided below the holding portions 15 is a support member 18 which is fixed with a plurality of screws 19 extending from below through the circular holes 20 provided in the support member 18 (at four locations in FIG. 2). The screw 19 has an upper end which is threaded into the female threaded hole formed in the lower end portion of the retaining block 11.

It will be noted that the support member 18 defines the lower end of the insert portion 14. The support member 18 is formed with a cylindrical protrusion 26 at its upper central portion, and with a cylindrical protrusion 26 at its upper central portion, and with a plurality of recesses 21 formed radially around the protrusion 26 and circumferentially displaced from the circular holes 20. There are four recesses 21 in FIG. 2.

Provided along the widthwise central portion of the recesses 21, respectively, is a channel 22 which extends radially in the support member 18.

There is a spacer 23 of a rectangular plate shape which is provided radially moveably within the recesses 21, respectively.

The spacers 23 have the same thickness T in dimension (see FIG. 4 and FIG. 6) which is smaller than the depth of the recesses 21 and known for every spacer 23.

The thickness T is larger than the width size h of the clearance 6 to be measured (T>h).

The spacers 23 have a mid portion, respectively, in which a circular hole 25 is formed through which the pin 27 provided at the tip portion of the rocking arm 16 is inserted. Further, the pins 27 have a tip portion which is inserted into the channel 22, respectively.

Accordingly, as the rocking arms 16 swing around the cross shaft 17, the tip portion of each of the spacers 23 moves in and out radially through the circumferential face of the lower part of the insert portion 14.

The minimum number of the spacers 23 is two, but desirably three or more spacers 23 are circumferentially provided with a uniform space between them.

The recesses 21 have a radially outer opening faced to the opening of the clearance 6 on the radially inside.

The tip portion of the spacers 23 is formed in a wedge shape in cross section such that the thickness is gradually reduced to the minimum thickness at its tip end.

The inner end edge of the inner rings 3a, 3b chamfered, so that the tip portion of the spacers 23 when projected radially out of the circumferential face of the lower part of the insert portion 14, advances between the inner end edge of the first inner ring 3a and the inner end edge of the second inner ring 3b expanding the clearance 6.

The resulting distance between the inner end edges of the inner rings 3a, 3b is referred to as the thickness T of the spacers 23.

Provided within the retaining block 11 is an actuator 24 to drive the spacers 23 so that the tip portion of the respective spacers 23 is moved in and out across the circumferential face of the lower part of the insert portion 14.

The actuator 24 comprises a cylinder hole 28 formed in the central interior of the retaining block 11 and a piston 29 air tightly fitted into the cylinder hole 28.

The rod 30 has an upper end connected to the piston 29 and a lower end formed with a recessed channel 31 on its outer peripheral surface.

Engaged in the recessed channel 31 is engagement portions 32 which are formed in the rocking arms 16, respectively.

The actuator 24 etc. together with the rocking arms 16 constitute a driving device to cause the tip end portions of the spacers 23 to move in and out through the circumferential face of the insert portion 14.

When the tip portion of the spacers 23 is retracted through the circumferential face of the lower part of the insert portion 14 by the actuator 24, compressed air is fed to below the piston 29 so as to move the rod 30 upwards.

As a result, the engagement portions 32 of the rocking arms 16 are moved upwards respectively, and the pins 27 provided at the tip portions of the rocking arms 16 cause the spacers 23, respectively, to retract radially inwards in the insert portion 14.

On the contrary, when projecting the tip portions of the spacers 23 radially out of the circumferential face of the insert portion 14, compressed air is fed above the piston 29 to move the rod 30 downwards.

As a result, the engagement portions 32 of the rocking arms 16 are forced downwards, so that the pins 27 provided at the tip portions of the rocking arms 16 are caused to force the spacers 23 radially outwards in the insert portion 14.

A cover plate 34 is provided to close the upper opening of the cylinder hole 28, and fixed with a screw onto the upper face of the retaining block 11.

Disposed above the retaining block 11 is a measurement device 33 for measuring the vertical position of the retaining block 11.

The measurement device 33 has a probe 33a the lower end of which is abutted to the upper face of the cover plate 34. Accordingly, the measurement device 33 can detect the vertical position of the retaining block 11.

Incidentally, the measurement device 33 can be any of the conventional comparators. Many of such conventional comparators for use in the present invention are explained in a various of guide books, and no need of explanation in this specification.

Figure 4:
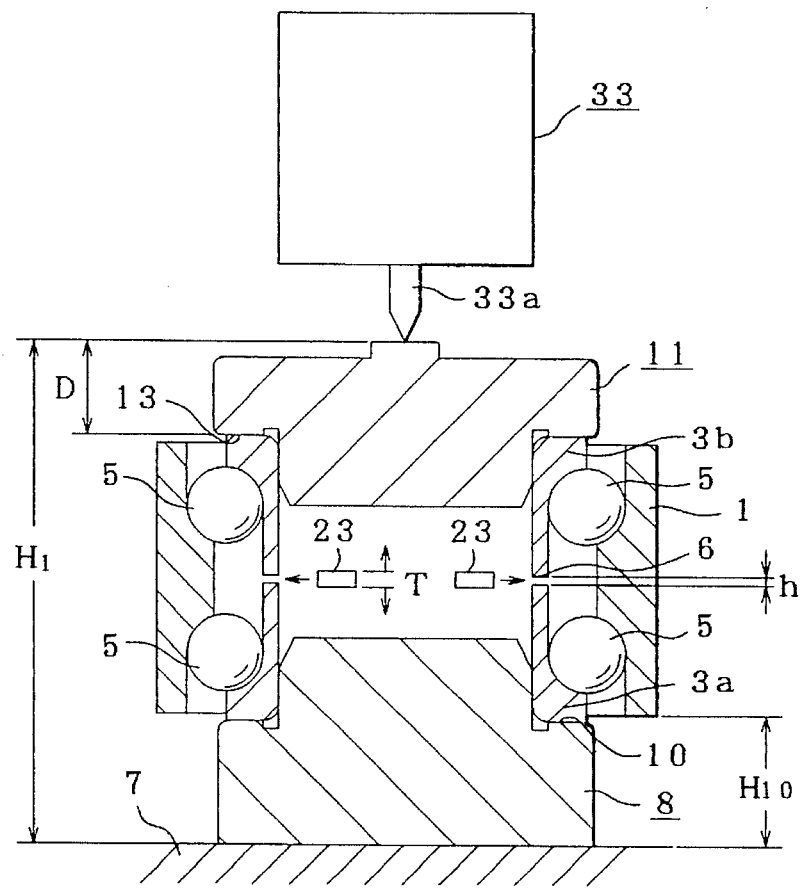
FIG. 4 is a vertical cross sectional view showing a state in measurement before the spacers are inserted between the inner rings.

In operation, using the apparatus according to the present invention as mentioned above, the width size h of the clearance 6 between the inner end edges of the inner rings 3a and 3b is measured as follows;

As shown in FIG. 4, without pressing the spacers 23 into the clearance 6, the weight of the retaining block 11 is used to lightly press the pair of inner rings 3a, 3b at their outer end faces so that they are moved closer to each other while the measurement device 33 is used to obtain the level $H_1$ of the upper face of the cover plate 34.

A signal indicating the level $H_1$ may be sent to a processor (not shown) like a microcomputer if necessary.

Figure 5:
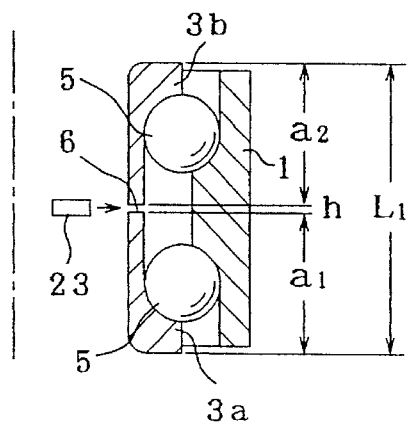
FIG. 5 is a cross sectional view showing the concept of the distance between the outer end faces of the inner rings in FIG. 4.

The level $H_1$ corresponds to the distance $L_1$ between the outer end face of the first inner ring 3a and the outer end face of the second inner ring 3b. Specifically, as shown in FIG. 5, the distance $L_1$ is the sum of the width size h of the clearance 6 and the width sizes $a_1$, and $a_2$ of the inner rings 3a, 3b, that is $(h+a_1+a_2)$.

Meanwhile, the difference $\Delta H$ between the distance $L_1$ and the level $H_1$ is always equal to the sum of the level $H_{10}$ of the bearing face 10 and the distance D between the retaining face 13 and the upper face of the cover plate 34, that is $\Delta H = H_{10} + D$. Accordingly, the level of the upper face of the cover plate 34 will indicate the variation of the distance between the outer end faces of the inner rings 3a, 3b.

Figure 6:
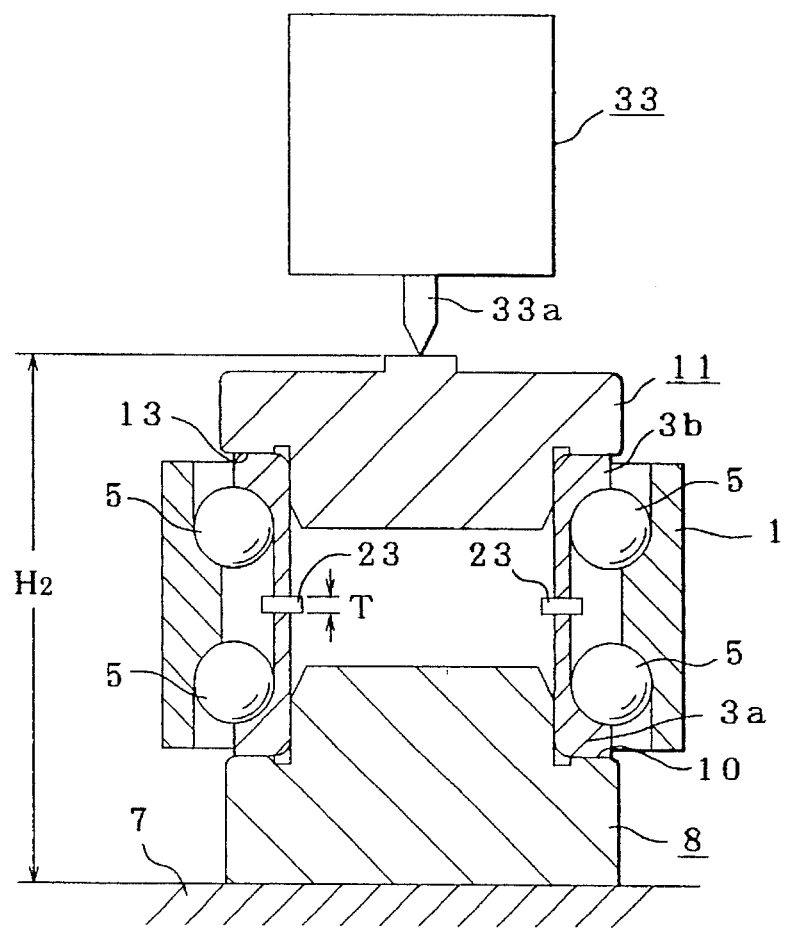
FIG. 6 is a vertical cross sectional view showing the state in measurement when the spacers are inserted between the inner rings.
Figure 7:
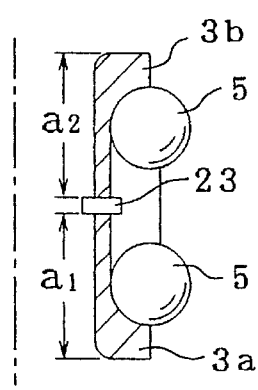
FIG. 7 is a cross sectional view showing the concept of the distance between the outer end faces of the inner rings in FIG. 6.

Once the level $H_1$ is obtained before the spacers 23 are inserted between the inner rings 3a, 3b, the spacers 23 are moved radially outwards to be inserted in the clearance 6, respectively, as shown in FIG. 6. As a result, the distance between the inner end edges of the inner rings 3a and 3b is widened to the thickness dimension T of the spacers 23. In this state, the measurement device 33 is used to obtain the level $H_2$ of the upper face of the cover plate 34.

The level $H_2$ corresponds to the distance between the outer faces of the inner rings 3a and 3b.

A signal indicating the level $H_2$ can be sent to a processor if necessary.

The level $H_2$ after insertion of the spacers 23 is higher than the level $H_1$ before insertion $(H_2 > H_1)$. This change is expected to be caused because the distance between the inner end edges of the inner ring 3a and 3b is changed from h to T.

Specifically, $$H_2 - H_1 = T - h \quad (1)$$

wherein T is known, and $H_1$ and $H_2$ are obtained as mentioned above.

Consequently, the preload clearance h is obtained by the following equation (2)

$$h = T - (H_2 - H_1) \quad (2)$$

The preload clearance h is automatically calculated by the processor and used to determine "good or not", if necessary.

In the present invention, the following effects are obtained;

(1) The preload clearance is precisely measured before the actual preload is applied.

(2) The automatic measurement is possible, and the whole number of the double row rolling bearings can be examined in situ at the bearing manufacturers.

The creditability of such bearings and automobiles etc. with such bearings incorporated is increased.

(3) The defective products can be instantly checked as they occur, and the defect condition, that is insufficient preload or excessive preload is simultaneously informed.

Accordingly, such information is instantly fed back for eliminating such defective products. Thus, the number of defective products is minimized.

(4) Measuring operation never erroneously affects the performance of the double row rolling bearing after measurement.

What is claimed is:

1. An apparatus for measuring preload clearance in a double row rolling bearing having an outer ring having outer raceways in double rows on an inner peripheral surface, first and second inner rings each having an inner raceway on an outer peripheral surface and each provided concentric with the outer ring, and a plurality of rolling members provided between the inner raceways and the outer raceways in double rows, respectively, the rolling members being preloaded so that the first and second inner rings are abutted to each other at inner end edges, the apparatus comprising a receiving block having an upper face to which the outer end face of the first inner ring is abutted, a retaining block having a lower face provided with a retaining face to which the outer end face of the second inner ring is abutted to apply a downward light weight to the second inner ring, an insert portion projected downwards from a lower face of the retaining block, which is provided radially inside the retaining face, so as to be received within the inner rings, a plurality of spacers having a thickness T and supported below the insert portion at a position lower than the retaining face by an axial length of the first inner ring so as to be displaced in a radial direction of the insert portion, a driving device for driving the spacers so that tip portions of the spacers move in and out across a circumferential face of the insert portion, and a measurement device for measuring the vertical position of the retaining block.

2. The apparatus of claim 1, wherein the thickness T is known.

* * * * *